Dec. 31, 1968         N. ELNEKAVE ET AL         3,419,769
LOW CAPACITANCE CONDENSER FOR USE AS A SECONDARY STANDARD
Filed Aug. 14, 1967

3,419,769
LOW CAPACITANCE CONDENSER FOR USE
AS A SECONDARY STANDARD
Nissim Elnekave, Combs-la-Ville, and Marcel Colombeau, Paris, France, assignors to Laboratoire Central des Industries Electriques, Fontenay-aux-Roses, France
Filed Aug. 14, 1967, Ser. No. 660,496
Claims priority, application France, Aug. 30, 1966, 74,609
8 Claims. (Cl. 317—244)

ABSTRACT OF THE DISCLOSURE

A new low capacitance condenser for use as a secondary standard of capacitance comprising a pair of circular axially spaced electrodes positioned on opposite sides of a metallic guard ring having a central aperature, and suspended on said guard ring by rings of a low-loss dielectric material, said electrodes, guard ring and dielectric rings being enclosed in a rigid sealed casing.

Specification

Figure 1:
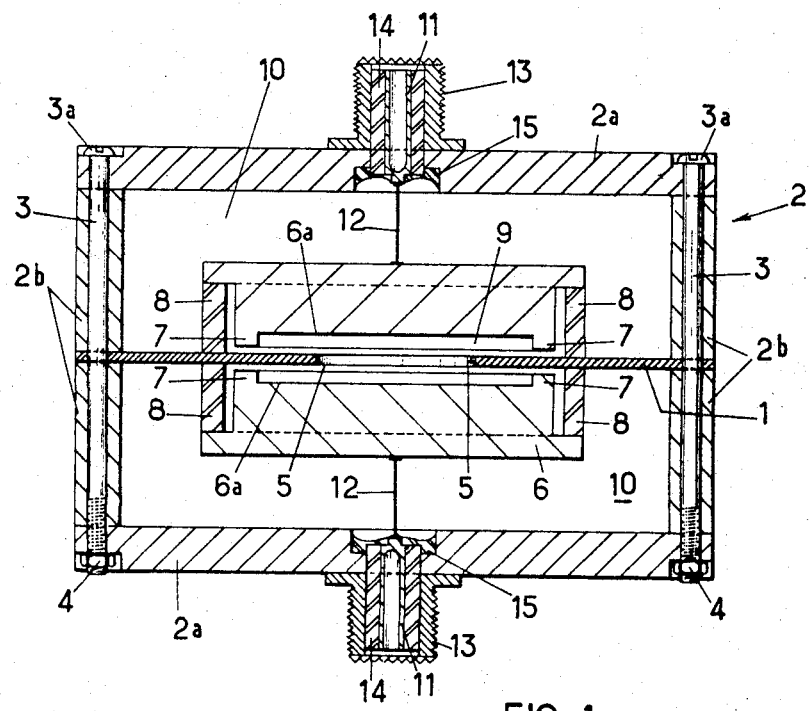

The problem of providing highly stable secondary standards of capacitance has heretofore remained unsolved.

One known type of condenser comprises parallel electrodes, one of which is connected to a grounded guard ring encircling that electrode through two insulating members, said guard ring being itself spaced from the other electrode by an insulating ring.

The mechanical stability of such a condenser is by no means perfect, since the mechanical connections between the electrode of largest diameter and the guard ring which encircles it, on the one hand, and the other electrode on the other hand, does not adequately ensure that the two principal electrodes are always kept exactly the same distance apart.

Moreover, the lines of force between the electrode of smaller diameter and the guard ring pass not only through the air but also through the insulating ring holding these two members together.

The same is true of the lines of force between the guard ring and the electrode of larger diameter, and in addition to these parasitic capacitances, which may be eliminated by appropriate mountings, some of the lines of force pass directly from one electrode to the other without passing through the guard ring, through the annular dielectrics, because no electrostatic insulator prevents these lines of force from reaching the annular members.

In other standard condensers, the different electrodes are rectangular in shape, these electrodes being so arranged the odd plates can be connected by metallic rods, and the even plates connected by other metallic rods. Braces, some of which may be metallic, are used to space the two sets of electrodes from a grounded support, which is suitably insulated from said metallic rods and braces.

Such condensers have lower dielectric losses than those previously described, since the lines of force are propagated through the air between one plate and the next, without passing through dielectric materials capable of causing such losses.

However, the threaded fastening rods which hold the plates together are not ordinarily rigid enough, especially if there are a great many plates, to keep the distances between neighboring electrodes strictly constant, and to keep the different electrodes perfectly parallel to each other, which results in variations in capacity which are particularly undesirable in the case of secondary standard capacitors.

The present invention partially overcomes these disadvantages and relates to a condenser having the following characteristics:

The two principal electrodes are fastened to each other by annular dielectric members, having very low losses which serve as spacers between the periphery of said electrodes and a metallic guard ring equidistant from said electrodes and centrally pierced by a diaphragmatic aperture having a diameter substantially smaller than the outer diameter of said electrodes.

The electrodes are provided with two circular protuberances close to the guard ring and mounted in the immediate vicinity of the annular dielectric members so that the lines of forces may pass directly from one electrode to the other through said aperture without encountering said guard ring, but cannot pass through the low loss dielectric members, which are in practice shielded by said annular protuberances, and are propagated only in the vacuum or in a gaseous low pressure environment, so that only negligeable dielectric losses result, and are contained in the sealed enclosure formed by the electrodes and the annular dielectric members.

The thick casing which may be used to ground the metallic sheaths of the two coaxial cables which are connected to the two electrodes of said condenser supports the peripheral part of the guard ring and the condenser assembly and in practice captures all the lines of force which extend between one electrode and the other but do not pass through said aperture.

A particular characteristic which ensures the mechanical stability and sealing of the condenser resides in the fact that the annular insulating members are made of a low loss material of very uniform dimensions, quartz, for example, and are attached to the guard ring and condenser electrodes either by soldering, after preliminary metallization of the outer surfaces of the annular members, or adhesively, by means of cements based on epoxy resins.

In view of the resulting excellent seal, the ambient humidity has no effect on the condenser.

The outer casing, which is made of thick, rigid components, and the method of suspending the condenser by means of said guard ring reduce the risk of changing the dimensions of the space between the two electrodes in response to external pressure changes especially near said aperture.

In manufacturing this standard condenser materials having a low coefficient of expansion are employed. For example plates of Invar are used for the electrodes and the guard ring, while the annular dielectric members are made of quartz or fused silica, so as to ensure a geometric shape which is unchanging over a large range of temperatures.

It will be seen from the following description, with reference to the accompanying drawings, that it is possible to utilize only the principal capacity of the condenser corresponding to the propagation of the lines of force through the aperture in the guard ring, without having to take into account the parasitic capacitances between each of the electrodes and the guard ring, by using certain conventional components, such as A/C Wheatstone bridges provided with Wagner grounds.

An important characteristic of the condenser according to the invention resides in the fact that the annular dielectric members which prevent deformation of the condenser are far enough away from the circular protuberances on the electrodes, as compared with the distance between said protuberances and the guard ring, to ensure that the lines of force extending from one electrode to the other through the aperture in the guard ring cannot pass through the annular dielectric members themselves.

Since, moreover, the casing of the condenser and its guard ring prevent any substantial direct mutual influence between the electrodes outside them, and intercept almost all the electrostatic flux which can pass from one electrode to the other through the annular dielectric members, the losses caused by these members are derived solely from the aforesaid parasitic capacities which are eliminated by the auxiliary Wagner grounds.

Figure 2:
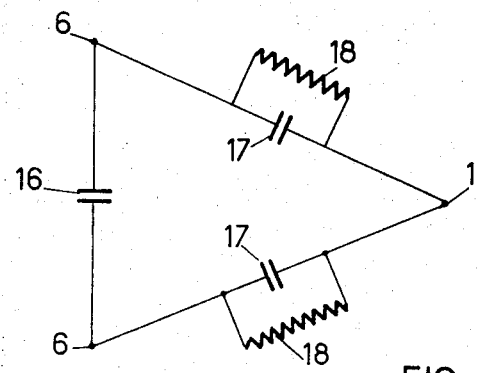

The characteristics of the present invention will be better understood after reading the following description of a specific embodiment of a standard condenser according to the invention, which embodiment is described purely by way of illustration, and with reference to the accompanying drawings, in which:

FIGURE 1 is a diametral section through a condenser according to the invention, and FIGURE 2 is a circuit diagram showing that the total capacity between the two electrodes is the sum of a principal capacity and two parasitic capacities between the electrodes and the ground. These parasitic capacities are shunted by resistances representing the dielectric losses in the annular dielectric members.

FIGURE 1 shows the condenser with its two electrodes positioned symmetrically with respect to a guard ring 1, which is mounted in the middle of an insulating case 2 made of thick substantially rigid members. The casing comprises two circular plates 2a, and four annular members 2b, within which the rods holding the assembly together are mounted.

FIGURE 1 shows two of the bores which receive the screws 3 which cooperate with the nuts 4. The heads 3a of the screws, and the nuts 4 are seated in recess in the casing 2.

The guard ring 1 is pierced by a central aperture, the outer edge of which is indicated by reference numeral 5.

The condenser comprises two symmetrical electrodes 6, the central parts 6a of which are thicker than their peripheries, especially near the aperture in the guard ring 1.

These electrodes are also provided near their peripheries with annular bosses 7, which facilitate the passage of the lines of force through the gaseous dielectric medium which separates the electrodes. The fact that the diameter of the aperture 5 is smaller than that of the bosses 7 practically prevents the direct passage of any lines of force from one electrode to the other through the dielectric members 8.

The condenser according to the invention does, however, permit some lines of force to pass between the electrodes 6 and the guard ring 1, through the annular dielectric members 8, which are in axial alignment, so that despite the fact that the members 8 are made of low loss material, certain dielectric losses represented by the resistances shunting the parasitic capacitances shown on FIGURE 2 do occur.

However, as has already been indicated, it is possible to use only the principal capacitance of the standard condenser by eliminating the parasitic capacitances and the dielectric losses resulting from the passage of lines of force through the solid dielectrics by using, for example, Wheatstone bridges provided with Wagner grounds.

It is easy to understand that the assembly formed by the members 8 and 9 and the guard ring 1 which may be soldered or adhesively fastened together, is very resistant to deformation. Its interior may therefore be kept under a vacuum, or it may be filled with any gaseous dielectric at a suitable pressure. The space between the electrodes is indicated by reference numeral 9 in the drawings. The space 10, between the casing and the condenser, which is suspended from the guard ring 1, may also be filled with a suitable gaseous dielectric.

In any case, the lines of force in the space 10 and in the members 8 necessarily pass through the casing or the guard ring, and the corresponding dielectric losses may be eliminated by appropriately mounting them, just like the parasitic capacitances. The bosses 7 and the aperture 5 practically prevent any direct passage of lines of force from one electrode to the other through the members 8.

The two electrodes are each connected to one of the two coaxial terminals 11, into which the pins (not shown) of the two flexible metallic conductors 12 may penetrate.

These terminals 11 are insulated from the ground 13, in electrical contact with the grounded casing, by annular insulators 14. The terminals are moistureproofed with an insulating adhesive 15, for example, the resin sold under the trade name "Araldite."

Such coaxial terminals are often provided for making connections to cables having external metal sheaths which are thus grounded through the grounds 13 of the coaxial terminals, which are in contact, both mechanically and electrically, with the members 2a of the casing.

The principal capacitance corresponding to the lines of force between the electrodes 6 in the area 6a of the aperture 5 is shown at 16 of FIGURE 2.

The parasitic capacitances between the electrodes 6 and the guard ring 1 are shown at 17 on FIGURE 2, while the dielectric losses due to these parasitic capacitances and the passage of any lines of force through the annular members 8 are represented by the shunt resistors 18.

It will of course be appreciated that the embodiment which has just been described may be modified as to detail, and elements thereof be replaced by their mechanical or electrical equivalents without thereby departing from the basic principles of the invention.

What is claimed is:

1. A low capacitance electrical condenser suitable for use as a secondary standard of capacitance and comprising in combination two electrodes fastened together by two annular dielectric members made of a low-loss dielectric material which space said electrodes from an intermediate metallic guard ring equidistant from said electrodes, said guard ring being pierced by a central aperture having a diameter substantially smaller than the external diameter of said electrodes and aligned therewith, said electrodes being provided with facing annular bosses closely approaching said guard ring and coaxial with and having a diameter substantially greater than that of said aperture, through which the lines of force between said electrodes pass without traversing said dielectric members, and a thick, rigid casing in which the periphery of said guard ring is mounted, whereby lines of force due to the parasitic capacitances of said condenser are drawn off by said casing and guard ring.

2. A condenser as claimed in claim 1 in which said annular dielectric members are made of a material selected from the group consisting of quartz and silica.

3. A condenser as claimed in claim 1 in which said electrodes and the guard ring are made of iron nickel alloy having a low coefficient of expansion.

4. A condenser as claimed in claim 1 in which the spaces between the two electrodes and between the guard ring and casing are filled with a low pressure gas having a low dielectric loss.

5. A condenser as claimed in claim 1 in which the space between the electrodes and the annular dielectric members is sealed fluid tight and maintained under subatmospheric pressure.

6. A condenser as claimed in claim 1 in which said annular dielectric members are metallized and said electrodes are soldered thereto.

7. A condenser as claimed in claim 1 in which said electrodes are secured to said annular dielectric members by adhesives having an epoxy resin base.

8. A condenser as claimed in claim 1 in which the casing is so rigid that variations in the ambient pressure are not transmitted to the electrodes.

References Cited

UNITED STATES PATENTS

| | | | |
|---|---|---|---|
| 2,193,710 | 3/1940 | Burnham | 317—244 X |
| 2,587,847 | 3/1952 | Hofmann | 317—242 X |

LEWIS H. MYERS, *Primary Examiner.*

ELLIOT A. GOLDBERG, *Assistant Examiner.*